US012677262B2

(12) United States Patent
Liu

(10) Patent No.: US 12,677,262 B2
(45) Date of Patent: Jul. 7, 2026

(54) FREQUENCY DOMAIN RESOURCE PROCESSING METHOD, FREQUENCY DOMAIN RESOURCE CONFIGURATION METHOD, AND RELATED DEVICE

(71) Applicant: VIVO MOBILE COMMUNICATION CO., LTD., Dongguan (CN)

(72) Inventor: Jinhua Liu, Dongguan (CN)

(73) Assignee: VIVO MOBILE COMMUNICATION CO., LTD., Dongguan (CN)

( * ) Notice: Subject to any disclaimer, the term of this patent is extended or adjusted under 35 U.S.C. 154(b) by 395 days.

(21) Appl. No.: 17/870,783

(22) Filed: Jul. 21, 2022

(65) Prior Publication Data

US 2022/0361174 A1     Nov. 10, 2022

Related U.S. Application Data

(63) Continuation of application No. PCT/CN2021/072402, filed on Jan. 18, 2021.

(30) Foreign Application Priority Data

Jan. 23, 2020    (CN) .......................... 202010076449.1

(51) Int. Cl.
H04W 72/0453        (2023.01)
H04L 27/26          (2006.01)
(52) U.S. Cl.
CPC ..... H04W 72/0453 (2013.01); H04L 27/2605 (2013.01)
(58) Field of Classification Search
CPC ...................... H04W 72/0453; H04W 27/2605
See application file for complete search history.

(56) References Cited

U.S. PATENT DOCUMENTS

| | | | | |
|---|---|---|---|---|
| 10,805,876 | B1 * | 10/2020 | Parihar | H04W 60/00 |
| 2017/0331670 | A1 * | 11/2017 | Parkvall | H04L 41/0816 |
| 2019/0349079 | A1 * | 11/2019 | Novlan | H04B 7/15542 |
| 2020/0229271 | A1 * | 7/2020 | You | H04W 72/23 |

(Continued)

FOREIGN PATENT DOCUMENTS

| | | |
|---|---|---|
| CN | 110418413 A | 11/2019 |
| CN | 110536466 A | 12/2019 |

(Continued)

OTHER PUBLICATIONS

Extended European Search Report issued in related European Application No. 21744470.2, mailed May 26, 2023, 9 pages.

(Continued)

*Primary Examiner* — Blake J Rubin
(74) *Attorney, Agent, or Firm* — IPX PLLC

(57)                    ABSTRACT

A method for frequency domain resource processing, a method for frequency domain resource configuration, and a related device are provided. The method for frequency domain resource processing includes: obtaining frequency domain configuration information, where the frequency domain configuration information includes at least one of configuration information of a guard band or configuration information of a frequency domain resource for a distributed unit (DU) of an Integrated Access Backhaul (IAB) node; and performing information transmission based on the frequency domain configuration information.

20 Claims, 6 Drawing Sheets

(56) References Cited

U.S. PATENT DOCUMENTS

| | | | | |
|---|---|---|---|---|
| 2020/0337057 | A1* | 10/2020 | Abedini | H04B 17/336 |
| 2021/0029025 | A1* | 1/2021 | Abedini | H04W 88/04 |
| 2021/0075493 | A1* | 3/2021 | Sohn | H04B 7/10 |
| 2021/0105782 | A1* | 4/2021 | Marcone | H04L 47/824 |
| 2021/0112550 | A1* | 4/2021 | Lekutai | H04W 72/541 |
| 2021/0144719 | A1* | 5/2021 | Choi | H04W 88/14 |
| 2021/0176759 | A1* | 6/2021 | Abedini | H04W 52/367 |
| 2021/0176793 | A1* | 6/2021 | Abedini | H04W 52/38 |
| 2021/0185749 | A1* | 6/2021 | Abedini | H04W 72/1263 |
| 2022/0061006 | A1* | 2/2022 | Liu | H04W 56/001 |
| 2022/0086884 | A1* | 3/2022 | Ronkainen | H04W 40/22 |
| 2022/0095283 | A1* | 3/2022 | Wei | H04L 5/0032 |
| 2022/0110112 | A1* | 4/2022 | Wei | H04W 72/27 |
| 2022/0131733 | A1* | 4/2022 | You | H04W 88/04 |
| 2022/0141074 | A1* | 5/2022 | You | H04L 27/2666 |
| | | | | 375/262 |
| 2022/0166567 | A1* | 5/2022 | Kurita | H04L 5/0003 |
| 2022/0225333 | A1* | 7/2022 | Liu | H04W 72/23 |
| 2022/0278741 | A1* | 9/2022 | Dahlman | H04B 7/15542 |
| 2022/0304010 | A1* | 9/2022 | Han | H04W 72/23 |
| 2022/0345285 | A1* | 10/2022 | You | H04W 72/29 |
| 2023/0034003 | A1* | 2/2023 | Kurita | H04W 92/20 |
| 2023/0034529 | A1* | 2/2023 | You | H04W 56/0015 |
| 2023/0037808 | A1* | 2/2023 | Park | H04W 56/00 |
| 2023/0345553 | A1* | 10/2023 | Maya | H04W 56/0045 |
| 2024/0073839 | A1* | 2/2024 | Kurita | H04W 56/0045 |
| 2024/0298333 | A1* | 9/2024 | You | H04W 72/231 |

FOREIGN PATENT DOCUMENTS

| | | | |
|---|---|---|---|
| WO | 2019158071 | A1 | 8/2019 |
| WO | 2019203991 | A1 | 10/2019 |
| WO | 2020010613 | A1 | 1/2020 |

OTHER PUBLICATIONS

Ericsson, "IAB resource configuration and multiplexing", 3GPP, R1-1910902, Oct. 2019, 9 pages.

Notice of reason of refusal issued in related Japanese Application No. 2022-544718, mailed Aug. 8, 2023, 6 pages.

Qualcomn Incorporated, "Upper layer parameters to support IAB physical layer operation", 3GPP TSG RAN WG2 Meeting# 108, R2-1916504, Nov. 2019, 13 pages.

AT&T, "Summary of 7.2.3.3 Mechanisms for resource multiplexing among backhaul and access links", 3GPP TSG RAN WG1 Meeting#97, R1-1907679, May 2019, 16 pages.

International Search Report issued in corresponding International Application No. PCT/CN2021/072402, mailed Apr. 16, 2021, 4 pages.

Huawei et al., "Physical layer design for NR IAB", 3GPP TSG RAN WG1 Meeting #95, R1-1812198, Nov. 16, 2018.

Office Action issued in related Korean Application No. 10-2022-7028101, mailed Dec. 11, 2024, 6 pages.

Huawei, "[IAB] TP to TR 38.174 System parameters", 3GPP TSG-RAN WG4 Meeting #93, R4-1914764, Nov. 2019, 11 pages.

Qualcomm Incorporated, "IAB Ad Hoc meeting minutes", 3GPP TSG-RAN WG4 #93, R4-1916161, Nov. 2019, 11 pages.

AT&T, "Summary #3 of 7.2.3.1—Mechanisms for resource multiplexing among backhaul and access links", 3GPP TSG RAN WG1 #99, R1-1913503, Nov. 2019, 17 pages.

Qualcomm Incorporated, "Enhancements to support NR backhaul links", 3GPP TSG RAN WG1 Meeting #94b, R1-1811256, Oct. 2018, 18 pages.

* cited by examiner

| Obtain frequency domain configuration information | 401 |

| Perform information transmission based on the frequency domain configuration information | 402 |

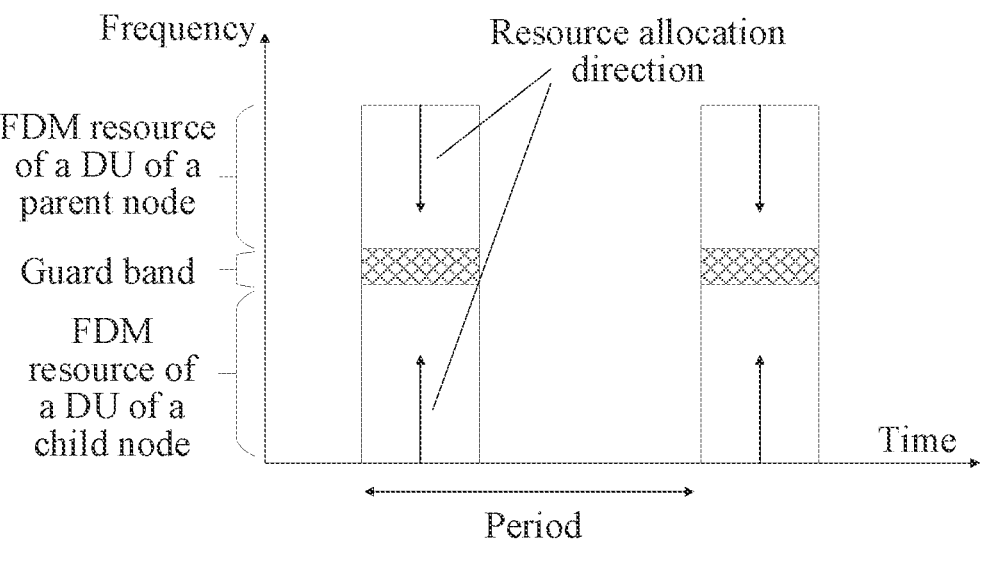

FIG. 6

Send frequency domain configuration information to an integrated access backhaul IAB node — 701

FIG. 7

Receive configuration information of a guard band from a DU of an IAB node; or in a case that a guard band is configured in a DU of an IAB node, if an overlap exists between a frequency domain resource scheduled by the DU for a fourth device and the guard band, perform rate matching or puncturing on the overlap — 801

FIG. 8

FREQUENCY DOMAIN RESOURCE PROCESSING METHOD, FREQUENCY DOMAIN RESOURCE CONFIGURATION METHOD, AND RELATED DEVICE

CROSS-REFERENCE TO RELATED APPLICATIONS

This application is a continuation of International Application No. PCT/CN2021/072402, filed Jan. 18, 2021, which claims priority to Chinese Patent Application No. 202010076449.1, filed Jan. 23, 2020. The entire contents of each of the above-referenced applications are expressly incorporated herein by reference.

TECHNICAL FIELD

The present disclosure relates to the field of communications technologies, and in particular, to a frequency domain resource processing method, a frequency domain resource configuration method, and a related device.

BACKGROUND

An Integrated Access Backhaul (IAB) system is a technology that has been standardized since New Radio (NR) Release 16 (Release 16, Rel-16). FIG. 1 is a schematic structural diagram of an IAB system. In this figure, an IAB node includes a Distributed Unit (DU) function part and a Mobile Termination (MT) function part. With the MT, the access IAB node can find an upstream IAB node (that is, a parent IAB node), and establish a wireless connection to a DU of the upstream IAB node. The wireless connection is called a backhaul link. After a complete backhaul link is established for an IAB node, the IAB node enables its DU function. The DU can provide cell services. In other words, the DU can provide access services for UE. An integrated access backhaul loop further includes a donor IAB node. The donor IAB node is directly connected to a wired transmission network.

FIG. 2 is a schematic diagram of a Centralized Unit-Distributed Unit (CU-DU) structure of an IAB system. In an integrated access backhaul loop, DUs of all IAB nodes are connected to a CU node. The CU node includes a CU control plane (CU-CP) and a CU user plane (CU-UP). The CU node configures the DUs by using an F1-AP protocol (F1 application protocol) and configures MTs by using a Radio Resource Control (RRC) protocol. A donor IAB node does not have an MT function part. The IAB system is introduced to deal with a case that a wired transmission network is not in place when access points are densely deployed. In other words, access points can rely on wireless backhaul in the absence of a wired transmission network.

In the prior art, however, a DU and an MT receive and transmit information in a Time Division Multiplexing (TDM) mode. This multiplexing mode may cause a longer latency in forwarding information performed by an IAB node. To decrease the latency in forwarding information performed by the IAB node, the DU and the MT may use a Space Division Multiplexing (SDM) or Frequency division multiplexing (FDM) mode. However, when the DU and the MT receive and transmit information in the SDM or FDM multiplexing mode, there is no related solution on how to receive and transmit information by using a frequency domain resource.

SUMMARY

According to a first aspect, an embodiment of the present disclosure provides a frequency domain resource processing method applied to an IAB node, where the method includes:

obtaining frequency domain configuration information, where the frequency domain configuration information includes at least one of configuration information of a guard band or configuration information of a frequency domain resource for a distributed unit DU of the IAB node; and performing information transmission based on the frequency domain configuration information.

According to a second aspect, an embodiment of the present disclosure further provides a frequency domain resource configuration method applied to a first device, where the method includes:

sending frequency domain configuration information to an integrated access backhaul IAB node, where the frequency domain configuration information includes at least one of configuration information of a guard band or configuration information of a frequency domain resource for a distributed unit DU of the IAB node.

According to a third aspect, an embodiment of the present disclosure further provides a frequency domain resource processing method applied to a first device, where the method includes:

receiving configuration information of a guard band from a DU of an IAB node; or in a case that a guard band is configured in a DU of an IAB node, when an overlap exists between a frequency domain resource scheduled by the DU for a fourth device and the guard band, performing rate matching or puncturing on the overlap.

According to a fourth aspect, an embodiment of the present disclosure further provides an IAB node. The IAB node includes:

an obtaining module, configured to obtain frequency domain configuration information, where the frequency domain configuration information includes at least one of configuration information of a guard band or configuration information of a frequency domain resource for a distributed unit DU of the IAB node; and a transmission module, configured to perform information transmission based on the frequency domain configuration information.

According to a fifth aspect, an embodiment of the present disclosure further provides a first device. The first device includes:

a sending module, configured to send frequency domain configuration information to an integrated access backhaul IAB node, where the frequency domain configuration information includes at least one of configuration information of a guard band or configuration information of a frequency domain resource for a distributed unit DU of the IAB node.

According to a sixth aspect, an embodiment of the present disclosure further provides a fourth device. The fourth device includes:

a transmission module, configured to: receive configuration information of a guard band from a DU of an IAB node; or in a case that a guard band is configured in a DU of an IAB node, if an overlap exists between a frequency domain resource scheduled by the DU for the fourth device and the guard band, perform rate matching or puncturing on the overlap.

According to a seventh aspect, an embodiment of the present disclosure further provides an IAB node, including a processor, a memory, and a computer program stored in the memory and capable of running on the processor. When the computer program is executed by the processor, the steps of the frequency domain resource processing method provided in the first aspect are implemented.

According to an eighth aspect, an embodiment of the present disclosure further provides a first device, including a processor, a memory, and a computer program stored in the memory and capable of running on the processor. When the computer program is executed by the processor, the steps of the frequency domain resource configuration method provided in the second aspect are implemented.

According to a ninth aspect, an embodiment of the present disclosure further provides a fourth device, including a processor, a memory, and a computer program stored in the memory and capable of running on the processor. When the computer program is executed by the processor, the steps of the frequency domain resource processing method provided in the third aspect are implemented.

According to a tenth aspect, an embodiment of the present disclosure further provides a computer readable storage medium, where a computer program is stored in the computer readable storage medium. When the computer program is executed by a processor, the steps of the frequency domain resource processing method provided in the first aspect are implemented, or the steps of the frequency domain resource configuration method provided in the second aspect are implemented, or the steps of the frequency domain resource processing method provided in the third aspect are implemented.

BRIEF DESCRIPTION OF DRAWINGS

To describe the technical solutions in the embodiments of the present disclosure more clearly, the following briefly describes the accompanying drawings required for describing the embodiments of the present disclosure. Apparently, the accompanying drawings in the following description show merely some embodiments of the present disclosure, and a person of ordinary skill in the art may still derive other drawings from these accompanying drawings without creative efforts.

FIG. 6 is a schematic diagram of FDM resource configuration according to an embodiment of the present disclosure;

FIG. 7 is a flowchart of a frequency domain resource configuration method according to an embodiment of the present disclosure;

FIG. 8 is a flowchart of another frequency domain resource processing method according to an embodiment of the present disclosure;

DETAILED DESCRIPTION

Figure 1:
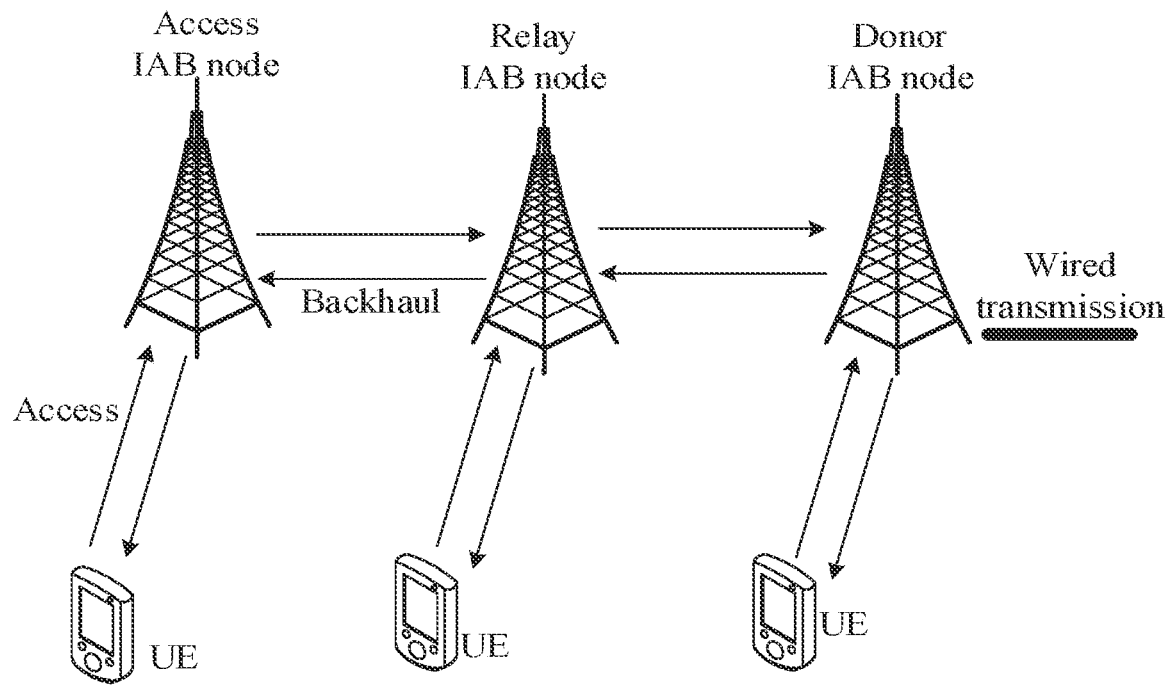
FIG. 1 is a schematic structural diagram of an IAB according to the related art.
Figure 2:
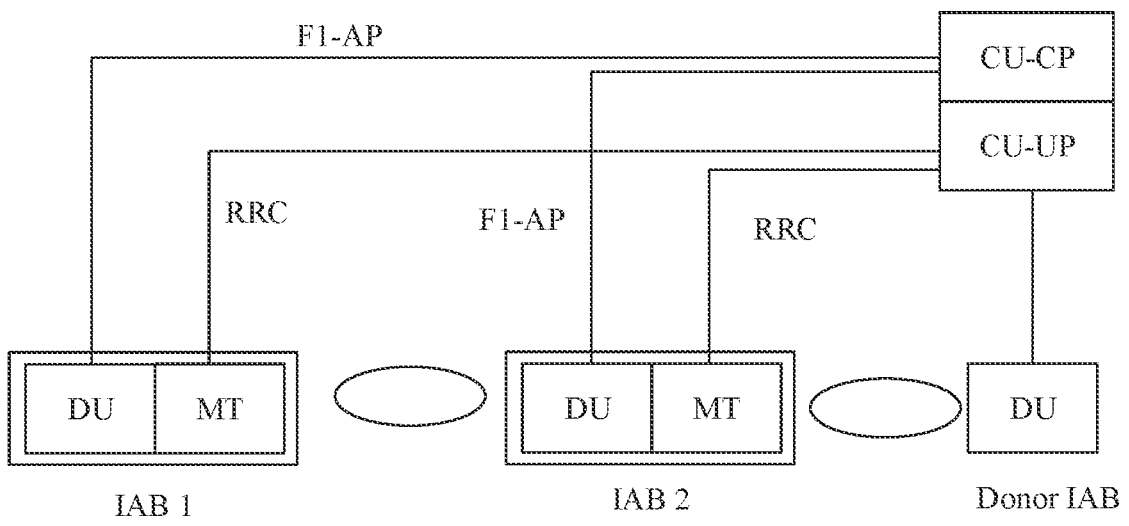
FIG. 2 is a schematic diagram of a CU-DU structure of an IAB system according to the related art.

The following clearly describes the technical solutions in the embodiments of the present disclosure with reference to the accompanying drawings in the embodiments of the present disclosure. Apparently, the described embodiments are some but not all of the embodiments of the present disclosure. All other embodiments obtained by a person of ordinary skill in the art based on the embodiments of the present disclosure shall fall within the protection scope of the present disclosure.

The terms "first", "second", and the like in this specification and claims of this application are used to distinguish between similar objects instead of describing a specific order or sequence. It should be understood that the data termed in such a manner are interchangeable in proper cases so that the embodiments of this application can be implemented in other orders than the order illustrated or described in this application. In addition, the terms "include", "have", and any other variant thereof are intended to cover a non-exclusive inclusion. For example, a process, method, system, product, or device that includes a list of steps or units is not necessarily limited to those steps or units that are expressly listed, but may include other steps or units that are not expressly listed or are inherent to the process, method, product, or device. In addition, "and/or" used in this specification and claims indicates at least one of the connected objects. For example, "A and/or B and/or C" represents the following seven cases: only A; only B; only C; both A and B; both B and C; both A and C; and all A, B, and C.

For ease of understanding the embodiments of the present disclosure, some related concepts included in the embodiments of the present disclosure are first described.

Space Division Multiplexing, (SDM)/Frequency division multiplexing (FDM) mode

A multiplexing mode of an access link and a backhaul link may be SDM or FDM. In the FDM multiplexing mode, a Distributed Unit (DU) and a Mobile Termination (MT) may simultaneously perform reception and transmission (that is, simultaneous reception, simultaneous transmission, or reception and transmission) on different frequency domain resources. In the SDM multiplexing mode, a DU and an MT may simultaneously perform reception and transmission (that is, simultaneous reception, simultaneous transmission, or reception and transmission) on a same frequency domain resource.

In this case, one of the DU and the MT may be interfered by the other when receiving a signal. For example, when receiving a signal, the DU is interfered by signal transmission or reception of the MT; or conversely, when receiving a signal, the MT is interfered by signal transmission or reception of the DU.

Duplexing mode between a DU and an MT

The duplexing mode between a DU and an MT of an IAB node includes a half duplex mode and a full duplex mode.

In case of half duplex, when one of the DU and the MT is transmitting a signal, the other one cannot receive a signal (or vice versa). Therefore, in the FDM or SDM multiplexing mode, the DU and the MT may perform reception and transmission in the following manners:

DU-TX&MT-TX: a Downlink (DL) is configured for the DU, and an Uplink (UL) is configured for the MT; and DU-RX&MT-RX: a UL is configured for the DU, and a DL is configured for the MT.

In case of full duplex, the DU and the MT may simultaneously perform reception and transmission. Therefore, in the FDM or SDM multiplexing mode, the DU and the MT may perform reception and transmission in the following manners:

DU-TX&MT-TX: a DL is configured for the DU, and a UL is configured for the MT;

DU-RX&MT-RX: a UL is configured for the DU, and a DL is configured for the MT;

DU-TX&MT-RX: a DL is configured for the DU, and a DL is configured for the MT; and DU-RX&MT-TX: a UL is configured for the DU, and a UL is configured for the MT.

In addition, in case of full duplex, the DU-TX&MT-RX or DU-RX&MT-TX is more suitable for a scenario in which the DU and the MT use different Radio Frequencies (RFs)/panels. It should be noted that the DU and the MT may also use different RFs/panels in the embodiments of the present disclosure.

Figure 3:
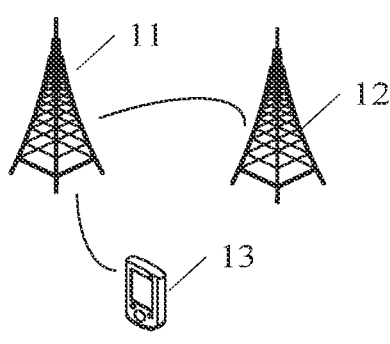
FIG. 3 is a structural diagram of a network system to which an embodiment of the present disclosure is applied.

Referring to FIG. 3, FIG. 3 is a structural diagram of a network system to which an embodiment of the present disclosure may be applied. As shown in FIG. 3, the network system includes an IAB node 11, a first device 12, and a fourth device 13, where the IAB node 11 includes a Distributed Unit (DU) and a Mobile Termination (MT). The first device 12 may be a Centralized Unit (CU) or a parent node (that is, a parent IAB node, which may also be referred to as an upstream IAB node) of the IAB node 11. The fourth device 13 may be User Equipment (UE) scheduled by the IAB node 11 or an MT of a child IAB node (that is, a child IAB node, which may also be referred to as a downstream IAB node) of the IAB node 11.

It should be noted that a frequency domain resource processing method provided in an embodiment of the present disclosure may be performed by the IAB node 11, a frequency domain resource configuration method provided in an embodiment of the present disclosure may be performed by the first device 12, and another frequency domain resource processing method may be performed by the fourth device 13. For details, refer to the following description.

Figure 4:
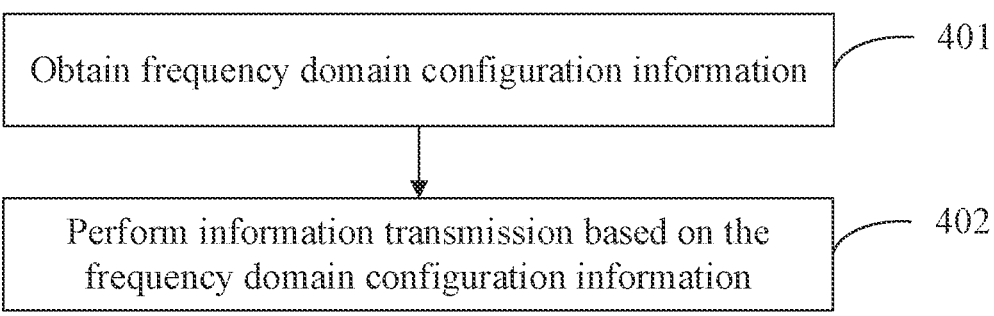
FIG. 4 is a flowchart of a frequency domain resource processing method according to an embodiment of the present disclosure.

An embodiment of the present disclosure provides a frequency domain resource processing method that is applied to an IAB node. Referring to FIG. 4, FIG. 4 is a flowchart of a frequency domain resource processing method according to an embodiment of the present disclosure. As shown in FIG. 4, the following steps are included.

Step 401: Obtain frequency domain configuration information, where the frequency domain configuration information includes at least one of configuration information of a guard band or configuration information of a frequency domain resource for a DU of an IAB node.

In this embodiment, the configuration information of the guard band may include configuration information of a guard band of at least one of a DU or an MT. In other words, the guard band may be configured in at least one of the DU or the MT.

In some embodiments, the frequency domain configuration information of the IAB node may be predefined in a protocol; the frequency domain configuration information of the IAB node may be configured by a CU, a parent node of the IAB node, or the like; or in addition to that the frequency domain configuration information of the IAB node is predefined in a protocol, the frequency domain configuration information of the IAB node may further be configured by a CU, a parent node of the IAB node, or the like.

In some embodiments, the frequency domain configuration information may be configured explicitly. For example, the frequency domain configuration information may be transmitted to the IAB node by using signaling such as RRC, F1-C, Downlink Control Information (DCI), or Media Access Control (MAC) Control Element (CE). The frequency domain configuration information may be configured implicitly. For example, an overlap between the frequency domain resource for the DU of the IAB node and a frequency domain resource for a DU of the parent node of the IAB node is specified as a frequency domain resource of a shared resource type for the DU of the IAB node; or a frequency domain resource at an upper boundary of a frequency domain resource of a hard resource type or soft resource type for the DU is specified as a guard band.

It should be noted that the frequency domain configuration information may further include configuration information of a frequency domain resource for the MT. This is not limited in this embodiment.

Step 402: Perform information transmission based on the frequency domain configuration information.

In this embodiment, at least one of the frequency domain resource for the DU or the guard band is configured, and information transmission is performed based on the configured at least one of the frequency domain resource for the DU or the guard band. In this way, interference between the DU and the MT can be reduced, or interference between the DU and the MT can be known, to ensure Quality of Service (QoS) of transmission.

In some embodiments, step 401, that is, the obtaining frequency domain configuration information, may include at least one of the following:

receiving frequency domain configuration information from a first device; or obtaining frequency domain configuration information predefined in a protocol.

In this embodiment, the first device may be the CU or the parent node of the IAB node.

In an implementation, the IAB node may receive the frequency domain configuration information from the first device. In other words, a frequency domain is configured by using the first device, which can improve the flexibility of frequency domain configuration.

In another implementation, the IAB node may obtain the frequency domain configuration information predefined in a protocol. In other words, frequency domain configuration is predefined in a protocol, which can save signaling and thereby save system resources.

In another implementation, the IAB node may obtain the frequency domain configuration information predefined in a protocol before obtaining the frequency domain configuration information from the first device, and perform information transmission based on the frequency domain configuration information predefined in the protocol. After obtaining the frequency domain configuration information from the first device, the IAB node performs information transmission based on the frequency domain configuration information obtained from the first device. In this way, the reliability of data transmission can be improved, and QoS of transmission can be ensured.

In some embodiments, the configuration information of the frequency domain resource for the DU includes a resource type of the frequency domain resource for the DU.

Figure 5:
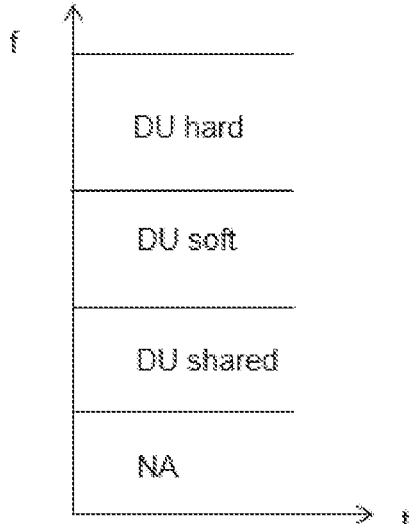
FIG. 5 is a schematic diagram of frequency domain resource type configuration according to an embodiment of the present disclosure.

In this embodiment, the frequency domain resource for the DU may be set to at least one of resource types. For example, the frequency domain resource for the DU may be set to one or more of a hard resource type (that is, a hard type), a soft resource type (that is, a soft type), a not-available resource type (that is, an NA type), a shared resource type (that is, a shared type), and the like. For example, as shown in FIG. 5, the DU is configured with a frequency domain resource of the hard type, a frequency domain resource of the soft type, a frequency domain resource of the shared type, and a frequency domain resource of the NA type.

In some embodiments, the resource type of the frequency domain resource for the DU may include at least one of the following: the hard resource type, the soft resource type, the not-available resource type, or the shared resource type.

A frequency domain resource of the hard resource type can only be used by the DU. A frequency domain resource of the soft resource type can be used by the DU only when reception and transmission of the MT are not affected or the frequency domain resource is indicated as available. A frequency domain resource of the not-available resource type cannot be used by the DU. A frequency domain resource of the shared resource type is simultaneously usable by the DU and the MT.

It should be noted that in this embodiment, a frequency domain resource of one or more of the foregoing resource types may be configured for the DU in an explicit manner, or a frequency domain resource of one or more of the foregoing resource types may be configured for the DU in an implicit manner. This is not limited.

In this embodiment, the frequency domain resource for the DU may be set to one or more of the hard resource type, the soft resource type, the not-available resource type, and the shared resource type, which can improve flexibility of resource configuration, and thereby can reduce interference in reception and transmission between the DU and the MT.

In some embodiments, the method may further include: receiving first indication information from a first device, where the first indication information is used to indicate a frequency domain resource of a soft resource type in the frequency domain resource for the DU to be used as a frequency domain resource of a first type; the first type includes at least one of the following: a hard resource type, a not-available resource type, or a shared resource type; and a frequency domain resource of the shared resource type is simultaneously usable by the DU and a mobile termination MT of the IAB node, that is, the DU and the MT may share the frequency domain resource for reception and transmission.

On the frequency domain resource of the shared resource type, the DU and the MT may perform reception and transmission in at least one of the following manners:

DU-TX&MT-TX: the DU transmits while the MT transmits;

DU-RX&MT-RX: the DU receives while the MT receives;

DU-TX&MT-RX: the DU transmits while the MT receives; or

DU-RX&MT-TX: the DU receives while the MT transmits.

In this embodiment, the first device may be the CU or the parent node of the IAB node. In some embodiments, the IAB node may receive the first indication information from the first device by using DCI signaling.

For example, the first indication information may indicate some or all of frequency domain resources of the soft resource type in the frequency domain resource configured for the DU to be used as frequency domain resources of the hard resource type, or indicate some or all of frequency domain resources of the soft resource type in the frequency domain resource configured for the DU to be used as frequency domain resources of the not-available resource type, or indicate some or all of frequency domain resources of the soft resource type in the frequency domain resource configured for the DU to be used as frequency domain resources of the shared resource type, or indicate some of frequency domain resources of the soft resource type in the frequency domain resource configured for the DU to be used as frequency domain resources of the hard resource type, and the other to be used as frequency domain resources of the shared resource type.

In this embodiment, the first indication information indicates the frequency domain resource of the soft resource type in the frequency domain resource for the DU to be used as the frequency domain resource of the first type, which can implement flexible resource type switching of the frequency domain resource configured for the DU.

In some embodiments, the configuration information of the frequency domain resource for the DU includes a resource location of the frequency domain resource for the DU.

In an implementation, the resource location of the frequency domain resource for the DU may be configured in a bitmap form. For example, a value of a bit in a bitmap is 1, indicating that a related frequency domain granularity is set to a related resource type, and a value of 0 indicates that the related frequency domain granularity is not set to the related resource type. A start position of the frequency domain resource may be a reference point A, a common resource block 0 (CRB 0), a physical resource block 0 (PRB 0), a start frequency of a Synchronous Signal Block (SSB), or the like.

In another implementation, the resource location of the frequency domain resource for the DU may be configured in a form of combining an offset and a bandwidth. For example, an offset may be related to a reference point A, a common resource block (CRB 0), a physical resource block 0 (PRB 0), a start frequency of an SSB, or the like, and a bandwidth may be a quantity of related frequency domain granularities.

In some embodiments, the offset and the bandwidth may be separately configured for a frequency domain resource of each resource type; or the offset is uniformly configured for the frequency domain resources of the DU, and the bandwidth is separately configured for a frequency domain resource of each resource type. For example, a frequency domain resource of each resource type may be predefined in a protocol to be on continuous frequency domain resources. A sequence of each resource type may be predefined in a protocol or configured. The offset is uniformly configured for the frequency domain resources of the DU, and the bandwidth is separately configured for a frequency domain resource of each resource type.

In some embodiments, a configuration granularity of the frequency domain resource for the DU is predefined in a protocol or configured by the first device.

In this embodiment, the configuration granularity may include but is not limited to one PRB, a plurality of PRBs, one subcarrier, or a plurality of subcarriers.

It should be noted that configuration granularities of frequency domain resources of different resource types in the frequency domain resource for the DU may be the same or different. For example, the configuration granularities of the frequency domain resources of different resource types in the frequency domain resource for the DU may all be two PRBs. A configuration granularity of a frequency domain resource of a hard type in the frequency domain resource for the DU is one PRB, a configuration granularity of a frequency domain resource of a soft type in the frequency domain resource for the DU is three PRBs, and the like.

In some embodiments, a frequency domain resource of a second type in the frequency domain resource for the DU is a periodic frequency domain resource, where the second type includes at least one of the following: a hard resource type, a soft resource type, a not-available resource type, or a shared resource type.

In this embodiment, one or more types of frequency domain resources in the frequency domain resource for the DU may be set to periodic frequency domain resources, that is, frequency domain resources that appear periodically. A time period of the frequency domain resource may be represented by a sequence number of a slot, a sequence number of an Orthogonal Frequency Division Multiplexing (OFDM) symbol, a time domain offset, duration, or the like.

For example, each type of frequency domain resource in the frequency domain resource for the DU may be set to a periodic frequency domain resource; or some types of frequency domain resources in the frequency domain resource for the DU may be set to periodic frequency domain resources.

In some embodiments, a resource type of an overlapping resource between the frequency domain resource for the DU and a first frequency domain resource is a shared resource type, where the first frequency domain resource is a frequency domain resource for the DU of the parent node of the IAB node, and a frequency domain resource of the shared resource type is simultaneously usable by the DU and a mobile termination MT of the IAB node.

In this embodiment, a frequency domain resource of the shared resource type of the DU may be configured implicitly. For example, in a slot or an OFDM symbol, an overlap exists between a frequency domain resource (that is, frequency domain configuration 1) configured for a DU of IAB node 1 and a frequency domain resource (that is, frequency domain configuration 2) configured for a DU of a parent IAB node (that is, IAB node 2) of the IAB node 1, and the overlap is a frequency domain resource of the shared type.

In some embodiments, if the CU notifies the IAB node 1 of the frequency domain configuration 2, and notifies the IAB node 2 of the frequency domain configuration 1, the two IAB nodes may determine a size of the overlap between the resources of the DUs of the two IAB nodes.

In this embodiment, the resource type of the overlapping resource between the frequency domain resource for the DU and the first frequency domain resource is implicitly set to the shared resource type, which can save signaling.

In some embodiments, a frequency domain resource of the shared resource type cannot be configured separately, but only by dynamically indicating a frequency domain resource of a soft resource type as a frequency domain resource of the shared resource type.

In some embodiments, the configuration information of the frequency domain resource for the DU includes a maximum transmit power of at least one type of frequency domain resource in the frequency domain resource for the DU.

In this embodiment, the maximum transmit power may be configured for the at least one type of frequency domain resource in the frequency domain resource for the DU. For example, a maximum transmit power may be configured for each type of frequency domain resource in the frequency domain resource for the DU. A maximum transmit power may be configured only for some types of frequency domain resources in the frequency domain resource for the DU. For example, a maximum transmit power is configured only for a frequency domain resource of a hard type, a shared type, or a soft type in the frequency domain resource for the DU.

In some embodiments, the maximum transmit power may be determined based on a maximum output power of the IAB node. For example, the maximum transmit power may be a ratio, an offset, or the like relative to the maximum output power of the IAB node, or may be a specific power value that is configured.

In this embodiment, the maximum transmit power is configured for the at least one type of frequency domain resource in the frequency domain resource for the DU, which facilitates power control performed when information transmission is performed based on the frequency domain resource for the DU.

In some embodiments, a resource type of a frequency domain resource that is in the frequency domain resource for the DU and that is carried in first signaling is a hard resource type, where the first signaling includes at least one of the following: an SSB, a Physical Downlink Control Channel (PDCCH), or a Channel State Information Reference Signal (CSI-RS).

In this embodiment, the CU or the parent node of the IAB node may configure or a protocol predefines that frequency domain resources for transmission of some special signaling are frequency domain resources of the hard type for the DU. In this way, signaling and resources used for configuring a frequency domain resource of the hard resource type for the DU can be saved.

In some embodiments, the method may further include: sending an expected frequency domain resource parameter to a first device, where the frequency domain resource parameter includes at least one of the following: a resource type, a bandwidth, or a frequency domain location.

In this embodiment, the IAB node may report, to the first device, a frequency domain resource parameter that the IAB node expects to be configured with, so that the first device may configure a frequency domain resource for the DU based on the frequency domain resource parameter reported by the IAB node. The first device may be the CU or the parent node of the IAB node.

In this embodiment, the IAB node sends the expected frequency domain resource parameter to the first device, so that the first device may configure the frequency domain resource for the DU based on the frequency domain resource parameter reported by the IAB node, which can improve accuracy of frequency domain resource configuration for the DU.

In some embodiments, the configuration information of the guard band includes at least one of the following: a bandwidth of the guard band or a location of the guard band.

In this embodiment, the bandwidth of the guard band may be one subcarrier, a plurality of subcarriers, one PRB, a plurality of PRBs, or the like, or may be an absolute bandwidth.

It should be noted that the bandwidth of the guard band and the location of the guard band may be predefined in a protocol, or may be configured by a first device. In a case that the location of the guard band is configured by the first device, the following two implementations may be included.

In one implementation, the location of the guard band may be configured explicitly. For example, the location of the guard band is configured by configuring an offset, where the offset may be related to a reference point A, a CRB 0, a PRB 0, or a start frequency of an SSB.

In the other implementation, the location of the guard band may be configured implicitly. For example, the location of the guard band may be determined based on a location of a frequency domain resource for a second device, where the second device is a device that is on the IAB node and that is configured with the guard band.

In some embodiments, the location of the guard band may include at least one of the following:

an upper boundary of a frequency domain resource for the second device;

a lower boundary of a frequency domain resource for the second device;

a frequency domain location adjacent to the upper boundary of the frequency domain resource for the second device;

a frequency domain location adjacent to the lower boundary of the frequency domain resource for the second device; or a boundary with the smallest frequency domain distance from a frequency domain resource for a third device in the frequency domain resource for the second device, where the third device is a device other than the second device on the IAB node, and the second device is a device that is on the IAB node and that is configured with the guard band.

In this embodiment, the second device may be the DU or an MT of the IAB node.

In a case that the guard band is configured in the DU of the IAB node, the location of the guard band may include at least one of the following: an upper boundary of a frequency domain resource for the DU, a lower boundary of a frequency domain resource for the DU, a frequency domain location adjacent to the upper boundary of the frequency domain resource for the DU, a frequency domain location adjacent to the lower boundary of the frequency domain resource for the DU, or a boundary with the smallest frequency domain distance from a frequency domain resource for the MT in the frequency domain resource for the DU.

For example, in a case that the guard band is configured in the DU of the IAB node, the location of the guard band may be on an upper boundary of a frequency domain resource of a hard type or a soft type in the frequency domain resource for the DU; or the location of the guard band may be on a lower boundary of a frequency domain resource of a hard type or a soft type in the frequency domain resource for the DU; or the location of the guard band may be at a frequency domain location adjacent to an upper boundary of a frequency domain resource of a hard type or a soft type in the frequency domain resource for the DU; or the location of the guard band may be at a frequency domain location adjacent to an lower boundary of a frequency domain resource of a hard type or a soft type in the frequency domain resource for the DU.

In a case that the guard band is configured in the MT of the IAB node, the location of the guard band may include at least one of the following: an upper boundary of a frequency domain resource for the MT, a lower boundary of a frequency domain resource for the MT, a frequency domain location adjacent to the upper boundary of the frequency domain resource for the MT, a frequency domain location adjacent to the lower boundary of the frequency domain resource for the MT, or a boundary with the smallest frequency domain distance from a frequency domain resource for the DU in the frequency domain resource for the MT.

In this embodiment, the location of the guard band is configured implicitly, which can save signaling and resources used for configuring the location of the guard band.

In some embodiments, the method may further include:

in a case that the guard band is configured in an MT of the IAB node, if an overlap exists between a scheduled frequency domain resource for the MT and the guard band, performing, by the MT, rate matching or puncturing on the overlap.

In this embodiment, in a case that the guard band is configured in the MT, if the overlap exists between the scheduled frequency domain resource for the MT and the guard band, the MT performs rate matching or puncturing on the overlap.

In some embodiments, in this embodiment, in a case that the guard band is at least one subcarrier, if the overlap exists between the scheduled frequency domain resource for the MT and the guard band, the MT may perform rate matching on the overlap.

In this embodiment, the MT performs rate matching or puncturing on the overlap, to improve utilization of a frequency resource.

In some embodiments, the method may further include:

in a case that the guard band is configured in the DU of the IAB node, sending the configuration information of the guard band to a fourth device scheduled by the DU.

In this embodiment, the fourth device may be User Equipment (UE) or an MT of a child node (that is, a child IAB node, which may also be referred to as a downstream IAB node) of the IAB node. In a case that the guard band is configured in the DU, the DU may send the configuration information of the guard band to the fourth device scheduled by the DU. For example, the DU may send the configuration information of the guard band to the fourth device by using an RRC message (such as a System Information Block (SIB) message or a UE-specific RRC message) or the like.

In some embodiments, the method may further include:

sending an expected guard band parameter to a first device, where the guard band parameter includes at least one of the following: a bandwidth of the guard band or a frequency domain location of the guard band.

In this embodiment, the guard band may be reported as a capability of the IAB node to the first device, such as the CU or the parent node of the IAB node. The first device may configure an FDM frequency resource based on the received guard band parameter reported by the IAB node.

In some embodiments, a size of a default guard band may be predefined in a protocol. In a case that the first device does not obtain a guard band capability of the IAB node, the first device may at least reserve a frequency resource with a size no less than that of the default guard band when configuring the FDM frequency resource.

In some embodiments, the frequency domain configuration information may be determined based on the expected guard band parameter, or determined based on a guard band parameter predefined in a protocol.

In some embodiments, in a case that the frequency domain configuration information includes only the configuration information of the guard band, the frequency domain resource for the DU of the IAB node is on a first side of the guard band, and a frequency domain resource for an MT of the IAB node is on a second side of the guard band.

In this embodiment, only the configuration information of the guard band may be configured for the IAB node, and that a frequency domain resource on one side of the guard band is the frequency domain resource for the DU and a frequency domain resource on the other side of the guard band is the frequency domain resource for the MT is predefined in a protocol or configured.

In some embodiments, a frequency domain resource for the IAB node and a frequency domain resource for the parent node of the IAB node are frequency domain resources allocated in a first allocation direction, where the first allocation direction is predefined in a protocol or configured by a first device.

In this embodiment, an FDM frequency domain resource may be allocated in an allocation direction predefined in a protocol or configured. For example, as shown in FIG. 6, a parent node allocates a resource downward from an upper boundary, and a child node allocates a resource upward from a lower boundary, which can maximize a space domain resource in the middle and reduce mutual interference.

In some embodiments, in a case that the frequency domain configuration information further includes configuration information of a frequency domain resource for an MT of the IAB node, the configuration information of the frequency domain resource for the MT may be predefined in a protocol, or may be configured by a first device.

In some embodiments, a configuration granularity of the frequency domain resource for the MT may be predefined in a protocol, or may be configured by the first device. The configuration granularity of the frequency domain resource for the MT may include but is not limited to one PRB, a plurality of PRBs, one subcarrier, or a plurality of subcarriers.

In some embodiments, a resource location of the frequency domain resource for the MT may be configured in a bitmap form, or a resource location of the frequency domain resource for the MT may be configured in a form of combining an offset and a bandwidth.

In conclusion, the configuration manner of the frequency domain resource for the DU and the configuration manner of the guard band that are provided in this embodiment of the present disclosure can implement interference suppression or interference-aware scheduling, and can improve frequency multiplexing efficiency and QoS of a service. In a case that the DU and the MT perform information transmission in the FDM multiplexing mode, interference between the DU and the MT can be reduced through proper configuration of the frequency domain resource for the DU and/or proper configuration of the guard band. In a case that the DU and the MT perform information transmission in the SDM multiplexing mode, the DU may be notified of an interfered frequency domain resource through frequency domain configuration, thereby assisting the DU in scheduling.

An embodiment of the present disclosure further provides a frequency domain resource configuration method that is applied to a first device. Referring to FIG. 7, FIG. 7 is a flowchart of a frequency domain resource configuration method according to an embodiment of the present disclosure. As shown in FIG. 7, the following step is included.

Step 701: Send frequency domain configuration information to an integrated access backhaul IAB node, where the frequency domain configuration information includes at least one of configuration information of a guard band or configuration information of a frequency domain resource for a distributed unit DU of the IAB node.

In this embodiment, the first device may be a CU or a parent node of the IAB node. The configuration information of the guard band may include configuration information of a guard band of at least one of a DU or an MT. In other words, the guard band may be configured in at least one of the DU or the MT.

In some embodiments, the frequency domain configuration information may be configured explicitly. For example, the frequency domain configuration information may be transmitted to the IAB node by using signaling such as RRC, F1-C, DCI, or MAC CE. The frequency domain configuration information may be configured implicitly. For example, an overlap between the frequency domain resource for the DU of the IAB node and a frequency domain resource for a DU of the parent node of the IAB node is specified as a frequency domain resource of a shared resource type for the DU of the IAB node; or a frequency domain resource at an upper boundary of a frequency domain resource of a hard resource type or soft resource type for the DU is specified as a guard band.

It should be noted that the frequency domain configuration information may further include configuration information of a frequency domain resource for the MT. This is not limited in this embodiment.

In this embodiment of the present disclosure, the first device configures at least one of the frequency domain resource for the DU or the guard band for the IAB node, so that the IAB node may perform information transmission based on the configured at least one of the frequency domain resource for the DU or the guard band. In this way, interference between the DU and the MT can be reduced, or interference between the DU and the MT can be known, to ensure QoS of transmission.

In some embodiments, the configuration information of the frequency domain resource for the DU includes a resource type of the frequency domain resource for the DU.

In some embodiments, the resource type includes at least one of the following: a hard resource type, a soft resource type, a not-available resource type, or a shared resource type, where a frequency domain resource of the shared resource type is simultaneously usable by the DU and a mobile termination MT of the IAB node.

In some embodiments, the method further includes:

sending first indication information to the IAB node, where the first indication information is used to indicate a frequency domain resource of a soft resource type in the frequency domain resource for the DU to be used as a frequency domain resource of a first type; the first type includes at least one of the following: a hard resource type, a not-available resource type, or a shared resource type; and a frequency domain resource of the shared resource type is simultaneously usable by the DU and a mobile termination MT of the IAB node.

In some embodiments, the configuration information of the frequency domain resource for the DU includes a resource location of the frequency domain resource for the DU.

In some embodiments, a configuration granularity of the frequency domain resource for the DU is predefined in a protocol or configured by the first device.

In some embodiments, a frequency domain resource of a second type in the frequency domain resource for the DU is a periodic frequency domain resource, where the second type includes at least one of the following: a hard resource type, a soft resource type, a not-available resource type, or a shared resource type.

In some embodiments, a resource type of an overlapping resource between the frequency domain resource for the DU and a first frequency domain resource is a shared resource type, where the first frequency domain resource is the frequency domain resource for the DU of the parent node of the IAB node, and a frequency domain resource of the shared resource type is simultaneously usable by the DU and a mobile termination MT of the IAB node.

In some embodiments, the configuration information of the frequency domain resource for the DU includes a maximum transmit power of at least one type of frequency domain resource in the frequency domain resource for the DU.

In some embodiments, a resource type of a frequency domain resource that is in the frequency domain resource for the DU and that is carried in first signaling is a hard resource type, where the first signaling includes at least one of the following: a synchronization signal block (SSB), a physical downlink control channel (PDCCH), or a channel state information-reference signal (CSI-RS).

In some embodiments, the method further includes:

receiving an expected frequency domain resource parameter from the IAB node, where the frequency domain resource parameter includes at least one of the following: a resource type, a bandwidth, or a frequency domain location.

In some embodiments, the configuration information of the guard band includes at least one of the following: a bandwidth of the guard band or a location of the guard band.

In some embodiments, the location of the guard band includes at least one of the following:

an upper boundary of a frequency domain resource for a second device;

a lower boundary of a frequency domain resource for the second device;

a frequency domain location adjacent to the upper boundary of the frequency domain resource for the second device;

a frequency domain location adjacent to the lower boundary of the frequency domain resource for the second device; or a boundary with the smallest frequency domain distance from a frequency domain resource for a third device in the frequency domain resource for the second device, where the third device is a device other than the second device on the IAB node, and the second device is a device that is on the IAB node and that is configured with the guard band.

In some embodiments, the method further includes:

receiving an expected guard band parameter from the IAB node, where the guard band parameter includes at least one of the following: a bandwidth of the guard band or a frequency domain location of the guard band.

In some embodiments, in a case that the frequency domain configuration information includes only the configuration information of the guard band, the frequency domain resource for the DU of the IAB node is on a first side of the guard band, and a frequency domain resource for an MT of the IAB node is on a second side of the guard band.

In some embodiments, a frequency domain resource for the IAB node and a frequency domain resource for the parent node of the IAB node are frequency domain resources allocated in a first allocation direction, where the first allocation direction is predefined in a protocol or configured by a first device.

An embodiment of the present disclosure further provides a frequency domain resource processing method that is applied to a fourth device. Referring to FIG. 8, FIG. 8 is a flowchart of another frequency domain resource processing method according to an embodiment of the present disclosure. As shown in FIG. 8, the following step is included.

Step 801: Receive configuration information of a guard band from a DU of an IAB node; or in a case that a guard band is configured in a DU of an IAB node, if an overlap exists between a frequency domain resource scheduled by the DU for the fourth device and the guard band, perform rate matching or puncturing on the overlap.

In this embodiment, the fourth device may be UE or an MT of a child node (that is, a child IAB node, which may also be referred to as a downstream IAB node) of the IAB node.

In a case that the guard band is configured in the DU, the DU may send the configuration information of the guard band to the fourth device scheduled by the DU. The fourth device may receive the configuration information of the guard band from the DU, so that the fourth device transmits information based on the configuration information of the guard band.

In a case that the guard band is configured in the DU of the IAB node, if an overlap exists between a frequency domain resource scheduled by the DU for the fourth device and the guard band, a first device performs rate matching or puncturing on the overlap, to improve utilization of frequency resource.

Figure 9:
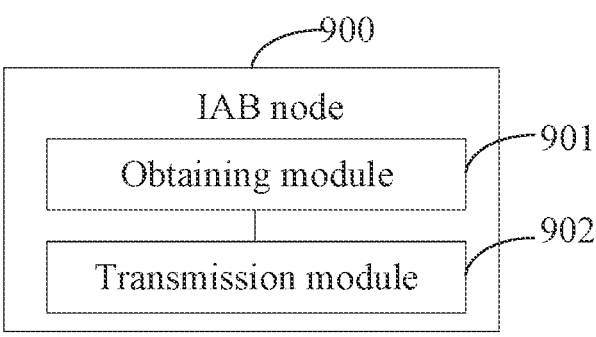
FIG. 9 is a structural diagram of an IAB node according to an embodiment of the present disclosure.

Referring to FIG. 9, FIG. 9 is a structural diagram of an IAB node according to an embodiment of the present disclosure. As shown in FIG. 9, an IAB node 900 includes:

an obtaining module 901, configured to obtain frequency domain configuration information, where the frequency domain configuration information includes at least one of configuration information of a guard band or configuration information of a frequency domain resource for a distributed unit DU of the IAB node; and a transmission module 902, configured to perform information transmission based on the frequency domain configuration information.

In some embodiments, the obtaining module is configured to perform at least one of the following:

receiving frequency domain configuration information from a first device; or obtaining frequency domain configuration information predefined in a protocol.

In some embodiments, the configuration information of the frequency domain resource for the DU includes a resource type of the frequency domain resource for the DU.

In some embodiments, the resource type includes at least one of the following: a hard resource type, a soft resource type, a not-available resource type, or a shared resource type, where a frequency domain resource of the shared resource type is simultaneously usable by the DU and a mobile termination MT of the IAB node.

In some embodiments, the IAB node further includes:

a receiving module, configured to receive first indication information from a first device, where the first indication information is used to indicate a frequency domain resource of a soft resource type in the frequency domain resource for the DU to be used as a frequency domain resource of a first type; the first type includes at least one of the following: a hard resource type, a not-available resource type, and a shared resource type; or a frequency domain resource of the shared resource type is simultaneously usable by the DU and a mobile termination MT of the IAB node.

In some embodiments, the configuration information of the frequency domain resource for the DU includes a resource location of the frequency domain resource for the DU.

In some embodiments, a configuration granularity of the frequency domain resource for the DU is predefined in a protocol or configured by the first device.

In some embodiments, a frequency domain resource of a second type in the frequency domain resource for the DU is a periodic frequency domain resource, where the second type includes at least one of the following: a hard resource type, a soft resource type, a not-available resource type, or a shared resource type.

In some embodiments, a resource type of an overlapping resource between the frequency domain resource for the DU and a first frequency domain resource is a shared resource type, where the first frequency domain resource is a frequency domain resource for a DU of a parent node of the IAB node, and a frequency domain resource of the shared resource type is simultaneously usable by the DU and a mobile termination MT of the IAB node.

In some embodiments, the configuration information of the frequency domain resource for the DU includes a maximum transmit power of at least one type of frequency domain resource in the frequency domain resource for the DU.

In some embodiments, a resource type of a frequency domain resource that is in the frequency domain resource for the DU and that is carried in first signaling is a hard resource type, where the first signaling includes at least one of the following: a synchronization signal block (SSB), a physical downlink control channel (PDCCH), or a channel state information-reference signal (CSI-RS).

In some embodiments, the IAB node further includes:

a first sending module, configured to send an expected frequency domain resource parameter to a first device, where the frequency domain resource parameter includes at least one of the following: a resource type, a bandwidth, or a frequency domain location.

In some embodiments, the configuration information of the guard band includes at least one of the following: a bandwidth of the guard band or a location of the guard band.

In some embodiments, the location of the guard band includes at least one of the following:

an upper boundary of a frequency domain resource for a second device;

a lower boundary of a frequency domain resource for the second device;

a frequency domain location adjacent to the upper boundary of the frequency domain resource for the second device;

a frequency domain location adjacent to the lower boundary of the frequency domain resource for the second device; or a boundary with the smallest frequency domain distance from a frequency domain resource for a third device in the frequency domain resource for the second device, where the third device is a device other than the second device on the IAB node, and the second device is a device that is on the IAB node and that is configured with the guard band.

In some embodiments, the IAB node further includes:

an MT, configured to: in a case that the guard band is configured in the MT of the IAB node, if an overlap exists between a scheduled frequency domain resource for the MT and the guard band, perform rate matching or puncturing on the overlap.

In some embodiments, the IAB node further includes:

a DU, configured to: in a case that the guard band is configured in the DU of the IAB node, send the configuration information of the guard band to a fourth device scheduled by the DU.

In some embodiments, the IAB node further includes:

a second sending module, configured to send an expected guard band parameter to a first device, where the guard band parameter includes at least one of the following: a bandwidth of the guard band or a frequency domain location of the guard band.

In some embodiments, in a case that the frequency domain configuration information includes only the configuration information of the guard band, the frequency domain resource for the DU of the IAB node is on a first side of the guard band, and a frequency domain resource for an MT of the IAB node is on a second side of the guard band.

In some embodiments, a frequency domain resource for the IAB node and a frequency domain resource for the parent node of the IAB node are frequency domain resources allocated in a first allocation direction, where the first allocation direction is predefined in a protocol or configured by the first device.

The IAB node 900 provided in this embodiment of the present disclosure can implement each process implemented by the IAB node in the foregoing method embodiment. To avoid repetition, details are not described herein again.

In the IAB node 900 provided in this embodiment of the present disclosure, the obtaining module 901 is configured to obtain the frequency domain configuration information, where the frequency domain configuration information includes at least one of the configuration information of the guard band or the configuration information of the frequency domain resource for the distributed unit DU of the IAB node; and the transmission module 902 is configured to perform information transmission based on the frequency domain configuration information. A manner of using a frequency domain resource is provided in a case that a DU and an MT use SDM or FDM multiplexing mode, so that interference in reception and transmission between the DU and the MT can be reduced or interference in reception and transmission between the DU and the MT can be known.

Figure 10:
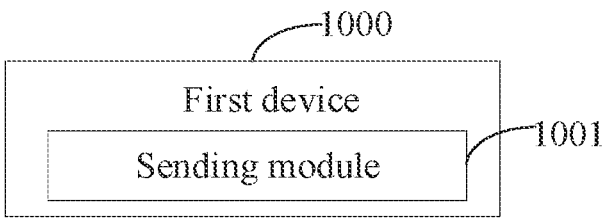
FIG. 10 is a structural diagram of a first device according to an embodiment of the present disclosure.

Referring to FIG. 10, FIG. 10 is a structural diagram of a first device according to an embodiment of the present disclosure. As shown in FIG. 10, the first device 1000 includes:

a sending module 1001, configured to send frequency domain configuration information to an IAB node, where the frequency domain configuration information includes at least one of configuration information of a guard band or configuration information of a frequency domain resource for a distributed unit DU of the IAB node.

The first device 1000 provided in this embodiment of the present disclosure can implement each process implemented by the first device in the foregoing method embodiment. To avoid repetition, details are not described herein again.

In the first device 1000 provided in this embodiment of the present disclosure, the sending module 1001 is configured to send the frequency domain configuration information to the IAB node, where the frequency domain configuration information includes at least one of the configuration information of the guard band or the configuration information of the frequency domain resource for the distributed unit DU of the IAB node. The first device configures at least one of the frequency domain resource for the DU or the guard band for the IAB node, so that the IAB node may perform information transmission based on the configured at least one of the frequency domain resource for the DU or the guard band. In this way, interference between the DU and an MT can be reduced, or interference between the DU and an MT can be known, to ensure QoS of transmission.

Figure 11:
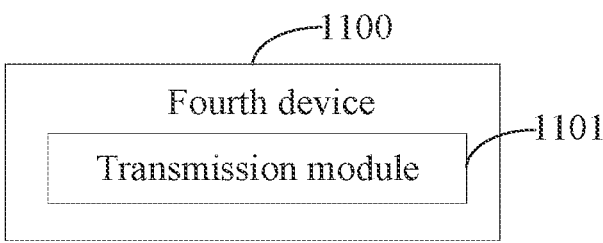
FIG. 11 is a structural diagram of a fourth device according to an embodiment of the present disclosure.

Referring to FIG. 11, FIG. 11 is a structural diagram of a fourth device according to an embodiment of the present disclosure. As shown in FIG. 11, the fourth device 1100 includes:

a transmission module 1101, configured to: receive configuration information of a guard band from a DU of an IAB node; or in a case that a guard band is configured in a DU of an IAB node, if an overlap exists between a frequency domain resource scheduled by the DU for the fourth device and the guard band, perform rate matching or puncturing on the overlap.

The fourth device 1100 provided in this embodiment of the present disclosure can implement each process implemented by the fourth device in the foregoing method embodiment. To avoid repetition, details are not described herein again.

In the fourth device 1100 provided in this embodiment of the present disclosure, the transmission module 1101 is configured to: receive the configuration information of the guard band from the DU of the IAB node; or in a case that the guard band is configured in the DU of the IAB node, if the overlap exists between the frequency domain resource scheduled by the DU for the fourth device and the guard band, perform rate matching or puncturing on the overlap. The configuration information of the guard band is received from the DU, which helps the fourth device perform information transmission based on the configuration information of the guard band. Rate matching or puncturing is performed on the overlap, which can improve utilization of a frequency resource.

Figure 12:
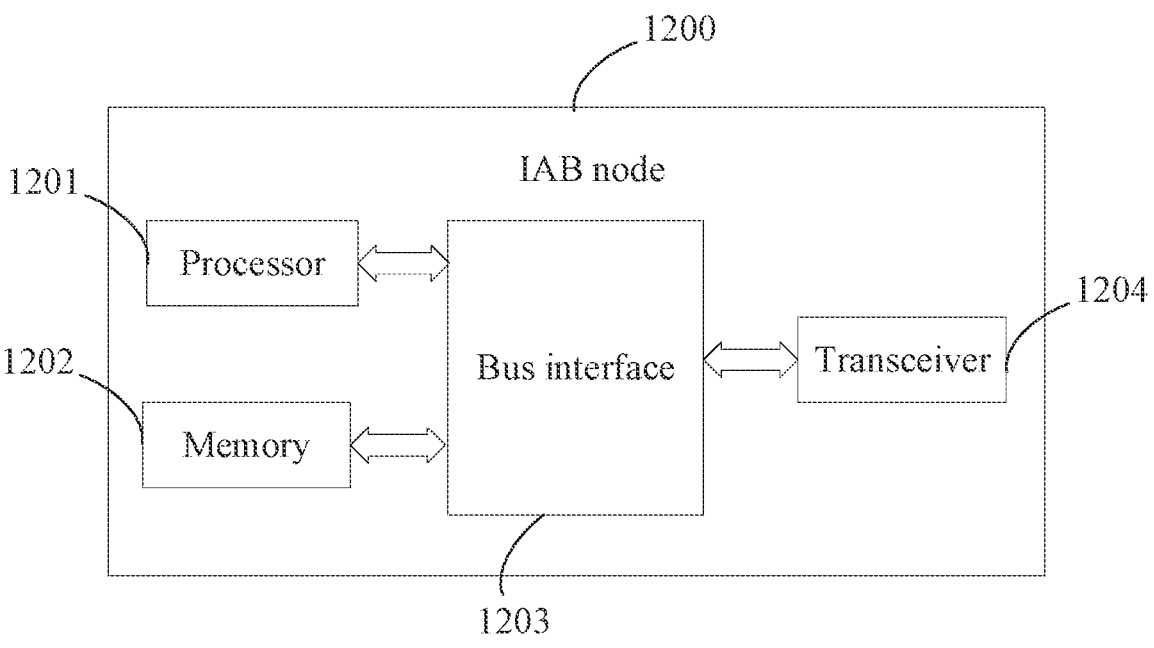
FIG. 12 is a structural diagram of another IAB node according to an embodiment of the present disclosure.

Referring to FIG. 12, FIG. 12 is a structural diagram of another IAB node according to an embodiment of the present disclosure. As shown in FIG. 12, the IAB node 1200 includes: a processor 1201, a memory 1202, a bus interface 1203, and a transceiver 1204. The processor 1201, the memory 1202, and the transceiver 1204 are all connected to the bus interface 1203.

In this embodiment of the present disclosure, the IAB node 1200 further includes: a computer program stored in the memory 1202 and capable of running on the processor 1201.

In this embodiment of the present disclosure, the transceiver 1204 is configured to:

obtain frequency domain configuration information, where the frequency domain configuration information includes at least one of configuration information of a guard band or configuration information of a frequency domain resource for a distributed unit DU of the IAB node; and perform information transmission based on the frequency domain configuration information.

It should be noted that in this embodiment, the processor 1201 and the transceiver 1204 can implement each process implemented by the IAB node in the foregoing method embodiment. To avoid repetition, details are not described herein again.

Figure 13:
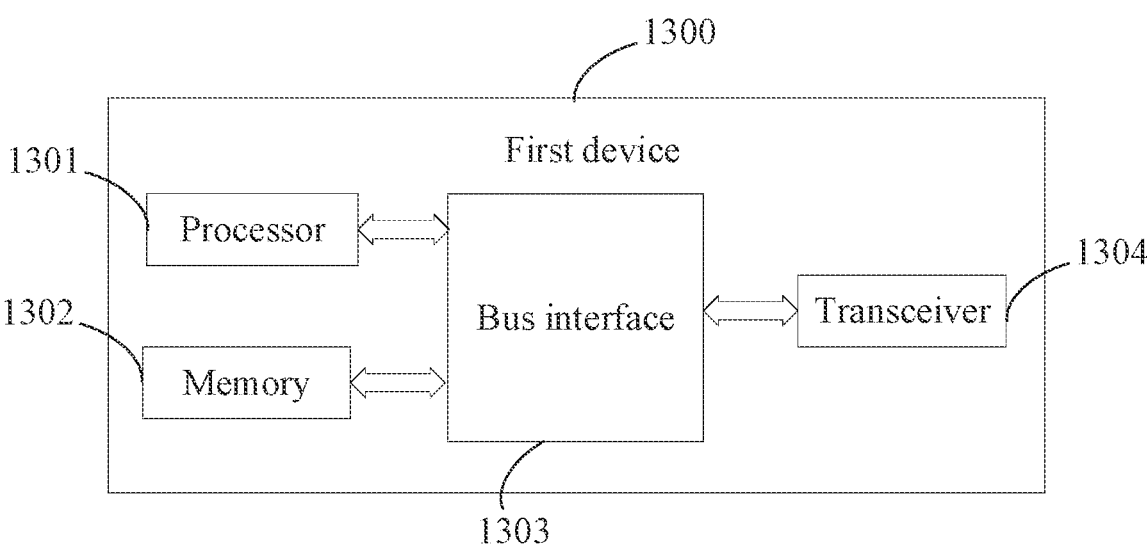
FIG. 13 is a structural diagram of another first device according to an embodiment of the present disclosure.

Referring to FIG. 13, FIG. 13 is a structural diagram of another first device according to an embodiment of the present disclosure. As shown in FIG. 13, the first device 1300 includes: a processor 1301, a memory 1302, a bus interface 1303, and a transceiver 1304. The processor 1301, the memory 1302, and the transceiver 1304 are all connected to the bus interface 1303.

In this embodiment of the present disclosure, the first device 1300 further includes: a computer program that is stored in the memory 1302 and can be run in the processor 1301.

In this embodiment of the present disclosure, the transceiver 1304 is configured to:

send frequency domain configuration information to an integrated access backhaul IAB node, where the frequency domain configuration information includes at least one of configuration information of a guard band or configuration information of a frequency domain resource for a distributed unit DU of the IAB node.

Figure 14:
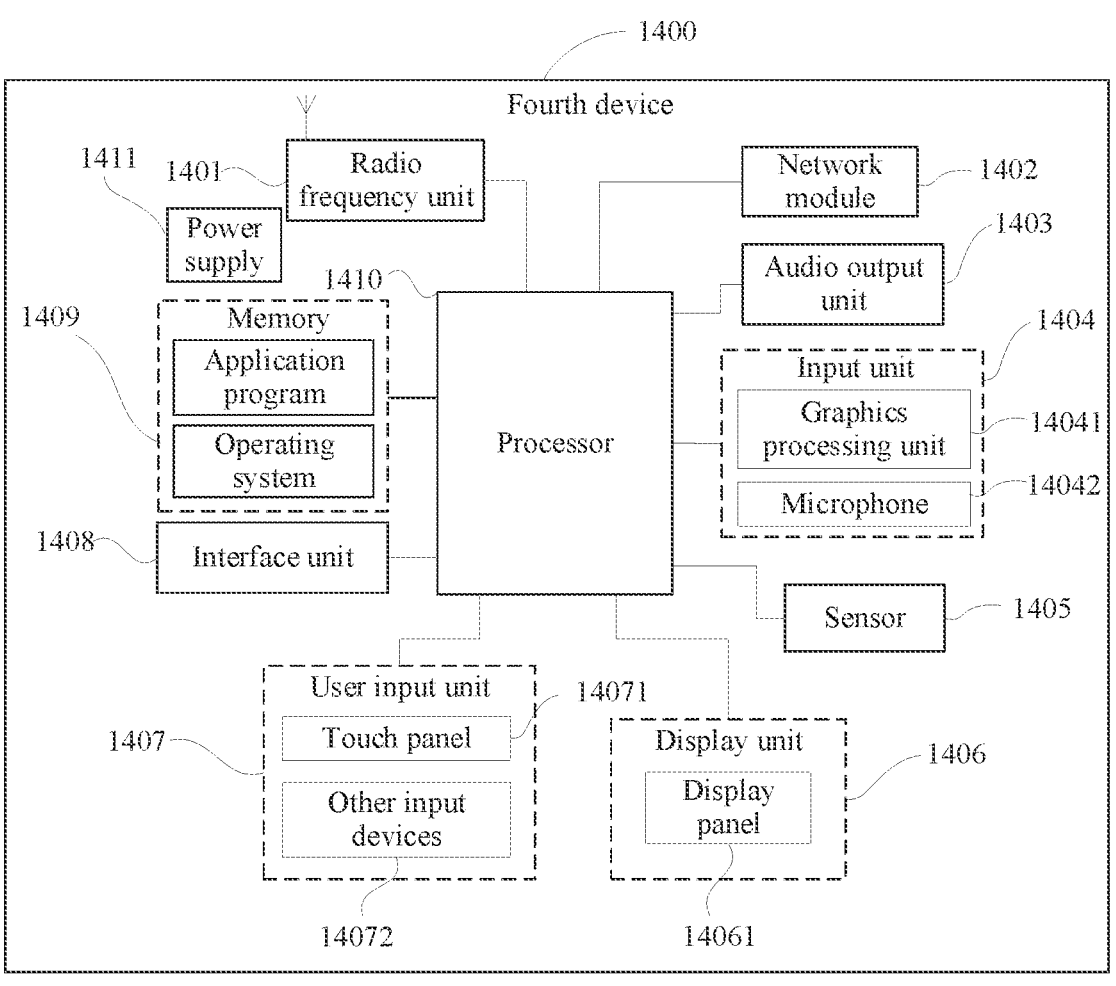
FIG. 14 is a structural diagram of another fourth device according to an embodiment of the present disclosure.

FIG. 14 is a structural diagram of another fourth device according to an embodiment of the present disclosure. Referring to FIG. 14, the fourth device 1400 includes but is not limited to the following components: a radio frequency unit 1401, a network module 1402, an audio output unit 1403, an input unit 1404, a sensor 1405, a display unit 1406, a user input unit 1407, an interface unit 1408, a memory 1409, a processor 1410, and a power supply 1411. A person skilled in the art may understand that the structure of the fourth device shown in FIG. 14 does not constitute a limitation on the fourth device. The fourth device may include components more or fewer than those shown in the figure, or combine some components, or have different component arrangements. In this embodiment of the present disclosure, the fourth device includes but is not limited to a mobile phone, a tablet computer, a notebook computer, a palmtop computer, an in-vehicle terminal, a wearable device, and a pedometer.

The radio frequency unit 1401 is configured to: receive configuration information of a guard band from a DU of an IAB node; or in a case that a guard band is configured in a DU of an IAB node, if an overlap exists between a frequency domain resource scheduled by the DU for the fourth device and the guard band, perform rate matching or puncturing on the overlap.

It should be understood that in this embodiment of the present disclosure, the radio frequency unit 1401 may be configured to: receive and transmit information; or receive and transmit a signal during a call. After receiving downlink data from a base station, the radio frequency unit 1401 transmits the downlink data to the processor 1401 for processing; and in addition, the radio frequency unit 1401 transmits uplink data to the base station. Generally, the radio frequency unit 1401 includes but is not limited to an antenna, at least one amplifier, a transceiver, a coupler, a low noise amplifier, a duplexer, or the like. In addition, the radio frequency unit 1401 may further communicate with a network and another device through a wireless communications system.

The fourth device provides wireless broadband Internet access for a user by using the network module 1402, for example, helps the user transmit and receive e-mails, browse web pages, and access streaming media.

The audio output unit 1403 may convert audio data received by the radio frequency unit 1401 or the network module 1402 or stored in the memory 1409 into an audio signal and output the audio signal as a sound. Moreover, the audio output unit 1403 may also provide an audio output (for example, a call signal reception sound or a message reception sound) related to a specific function performed by the fourth device 1400. The audio output unit 1403 includes a speaker, a buzzer, a telephone receiver, and the like.

The input unit 1404 is configured to receive an audio or video signal. The input unit 1404 may include a Graphics Processing Unit (GPU) 14041 and a microphone 14042. The graphics processing unit 14041 processes image data of a static picture or a video that is obtained by an image capture apparatus (for example, a camera) in a video capture mode or an image capture mode. A processed image frame may be displayed on the display unit 1406. An image frame processed by the graphics processing unit 14041 may be stored in the memory 1409 (or another storage medium) or sent by the radio frequency unit 1401 or the network module 1402. The microphone 14042 can receive a sound and can process the sound into audio data. The processed audio data can be converted, for outputting, into a format that can be sent to a mobile communication base station through the radio frequency unit 1401 in a telephone call mode.

The fourth device 1400 further includes at least one sensor 1405, for example, an optical sensor, a motion sensor, and other sensors. The optical sensor includes an ambient light sensor and a proximity sensor. The ambient light sensor may adjust the brightness of a display panel 14061 based on the intensity of ambient light. When the fourth device 1400 moves near an ear, the proximity sensor may disable the display panel 14061 and/or backlight. As a type of motion sensor, an accelerometer sensor can detect magnitudes of accelerations in all directions (usually three axes), can detect a magnitude and a direction of gravity when being static, and can be applied to fourth device posture recognition (such as screen switching between portrait and landscape, related games, and magnetometer posture calibration), functions related to vibration recognition (such as a pedometer and tapping), and the like. The sensor 1405 may also include a fingerprint sensor, a pressure sensor, an iris sensor, a molecular sensor, a gyroscope, a barometer, a hygrometer, a thermometer, an infrared sensor, and the like. Details are not described herein.

The display unit 1406 is configured to display information input by the user or information provided for the user. The display unit 1406 may include the display panel 14061. The display panel 14061 may be configured in a form of a Liquid Crystal Display (LCD), an Organic Light-Emitting Diode (OLED), or the like.

The user input unit 1407 may be configured to receive input digit or character information, and generate key signal input that is related to user setting and function control of the fourth device. The user input unit 1407 includes a touch panel 14071 and other input devices 14072. The touch panel 14071, also referred to as a touchscreen, may capture a touch operation performed by a user on or near the touch panel (for example, an operation performed by the user on the touch panel 14071 or near the touch panel 14071 by using any appropriate object or accessory such as a finger or a stylus). The touch panel 14071 may include two parts: a touch detection apparatus and a touch controller. The touch detection apparatus detects a touch direction of the user, detects a signal carried by a touch operation, and transmits the signal to the touch controller. The touch controller receives touch information from the touch detection apparatus, converts the touch information to point coordinates, and sends the point coordinates to the processor 1410, and receives and executes a command sent by the processor 1410. In addition, the touch panel 14071 may be implemented in a plurality of forms, for example, as a resistive, capacitive, infrared, or surface acoustic wave touch panel. The user input unit 1407 may further include other input devices 14072 in addition to the touch panel 14071. The other input devices 14072 may include but are not limited to a physical keyboard, a function key (such as a volume control key or a power on/off key), a trackball, a mouse, a joystick, and the like. Details are not described herein.

Further, the touch panel 14071 may cover the display panel 14061. After detecting a touch operation on or near the touch panel 14071, the touch panel 14071 transmits the touch operation to the processor 1410 to determine a type of a touch event. Then the processor 1410 provides corresponding visual output on the display panel 14061 based on the type of the touch event. In FIG. 14, the touch panel 14071 and the display panel 14061 serve as two separate components to implement the input and output functions of the fourth device. However, in some embodiments, the touch panel 14071 and the display panel 14061 may be integrated to implement the input and output functions of the fourth device. This is not specifically limited herein.

The interface unit 1408 is an interface through which an external apparatus is connected to the fourth device 1400. For example, the external apparatus may include a wired or wireless headphone port, an external power supply (or battery charger) port, a wired or wireless data port, a memory card port, a port for connecting an apparatus provided with an identification module, an audio input/output (I/O) port, a video I/O port, or an earphone port. The interface unit 1408 may be configured to receive an input (for example, data information or power) from an external apparatus and transmit the received input to one or more elements within the fourth device 1400, or may be configured to transmit data between the fourth device 1400 and the external apparatus.

The memory 1409 may be configured to store a software program and various data. The memory 1409 may mainly include a program storage area and a data storage area. The program storage area may store an operating system, an application program required for at least one function (such as a sound play function and an image play function), or the like. The data storage area may store data (such as audio data and a phone book) created based on use of a mobile phone, and the like. In addition, the memory 1409 may include a high-speed random access memory, or may include a non-volatile memory, for example, at least one magnetic disk storage device, a flash memory device, or other volatile solid-state storage devices.

The processor 1410 is a control center of the fourth device, uses various interfaces and lines to connect all parts of the entire fourth device, and performs various functions and data processing of the fourth device by running or executing the software program and/or module stored in the memory 1409 and invoking data stored in the memory 1409, thereby performing overall monitoring on the fourth device. The processor 1410 may include one or more processing units. The processor 1410 may integrate an application processor and a modem processor. The application processor mainly processes the operating system, a user interface, an application program, and the like. The modem processor mainly processes wireless communication. It may be understood that the modem processor may not be integrated into the processor 1410.

The fourth device 1400 may further include a power supply 1411 (for example, a battery) that supplies power to each component. The power supply 1411 may be logically connected to the processor 1410 by using a power management system, so as to implement functions such as charging management, discharging management, and power consumption management by using the power management system.

In addition, the fourth device 1400 includes some functional modules that are not illustrated. Details are not described herein.

An embodiment of the present disclosure further provides a fourth device, including a processor 1410, a memory 1409, and a computer program that is stored in the memory 1409 and that can be run in the processor 1410. When the computer program is executed by the processor 1410, each process in the foregoing embodiments of the frequency domain resource processing method is implemented, and the same technical effects can be achieved. To avoid repetition, details are not described herein again.

An embodiment of the present disclosure further provides a computer readable storage medium, where a computer program is stored in the computer readable storage medium. When the computer program is executed by a processor, each process in the foregoing embodiments of the frequency domain resource processing method is implemented, or each process in the foregoing embodiments of the frequency domain resource configuration method is implemented; and the same technical effects can be achieved. To avoid repetition, details are not described herein again. For example, the computer readable storage medium is a Read-Only Memory (ROM), a Random Access Memory (RAM), a magnetic disk, or an optical disc.

It should be noted that in this specification, the term "comprise", "include", or any other variant thereof is intended to cover a non-exclusive inclusion, so that a process, a method, an article, or an apparatus that includes a list of elements not only includes those elements but also includes other elements that are not expressly listed, or further includes elements inherent to such process, method, article, or apparatus. In absence of more constraints, an element preceded by "includes a . . . " does not preclude the existence of other identical elements in the process, method, article, or apparatus that includes the element.

According to the description of the foregoing implementations, persons skilled in the art can clearly understand that the method in the foregoing embodiments may be implemented by software in addition to a necessary universal hardware platform or by hardware only. The software product is stored in a storage medium (for example, ROM/RAM, a magnetic disk, or an optical disc), and includes several instructions for instructing a terminal (which may be a mobile phone, a computer, a server, an air conditioner, a network device, or the like) to perform the method described in the embodiments of the present disclosure.

The embodiments of the present disclosure are described above with reference to the accompanying drawings, but the present disclosure is not limited to the foregoing specific implementations. The foregoing specific implementations are merely illustrative but not restrictive. Under the inspiration of the present disclosure and without departing from the purpose and the protection scope of the claims of the present disclosure, a person of ordinary skill in the art may make a plurality of forms, which all fall within the protection of the present disclosure.

What is claimed is:

1. A method for frequency domain resource processing, performed by an Integrated Access Backhaul (IAB) node, comprising:
sending an expected frequency domain resource parameter to a first device, wherein the frequency domain resource parameter comprises a resource type, the resource type comprises a shared resource type, wherein the shared resource type is simultaneously usable by a distributed unit (DU) of the IAB node and a mobile termination (MT) of the IAB node;
obtaining frequency domain configuration information from the first device, wherein the frequency domain configuration information comprises configuration information of a guard band configured for a second device on the IAB node; and
performing information transmission based on the frequency domain configuration information,
wherein the configuration information of the guard band specifies a location of the guard band relative to a frequency domain resource for the second device, comprising at least one of the following:
the guard band being placed at a frequency domain location adjacent to an upper boundary of the frequency domain resource for the second device;
the guard band being placed at a frequency domain location adjacent to a lower boundary of the frequency domain resource for the second device; or
the guard band being placed at the smallest frequency domain distance away from a frequency domain resource for a third device in the frequency domain resource for the second device, wherein the third device is a device other than the second device on the IAB node.

2. The method according to claim 1,
wherein the frequency domain configuration information further comprises configuration information of a frequency domain resource for the DU of the IAB node.

3. The method according to claim 2, wherein the configuration information of the frequency domain resource for the DU comprises a resource type of the frequency domain resource for the DU.

4. The method according to claim 2, further comprising:
receiving first indication information from the first device, wherein the first indication information is used to indicate a frequency domain resource of a soft resource type in the frequency domain resource for the DU to be used as a frequency domain resource of a first type; the first type comprises at least one of the following: a hard resource type, a not-available resource type, or the shared resource type; and a frequency domain resource of the hard resource type is only used by the DU of the IAB node.

5. The method according to claim 2, wherein the configuration information of the frequency domain resource for the DU comprises a resource location of the frequency domain resource for the DU.

6. The method according to claim 2, wherein a configuration granularity of the frequency domain resource for the DU is predefined in a protocol or configured by a first device.

7. The method according to claim 2, wherein a frequency domain resource of a second type in the frequency domain resource for the DU is a periodic frequency domain resource, wherein the second type comprises at least one of the following: a hard resource type, a soft resource type, a not-available resource type, or the shared resource type.

8. The method according to claim 2, wherein a resource type of an overlapping resource between the frequency domain resource for the DU and a first frequency domain resource is the shared resource type, wherein the first frequency domain resource is a frequency domain resource for a DU of a parent node of the IAB node.

9. The method according to claim 2, wherein the configuration information of the frequency domain resource for the DU comprises a maximum transmit power of at least one type of frequency domain resource in the frequency domain resource for the DU.

10. The method according to claim 2, wherein a resource type of a frequency domain resource that is in the frequency domain resource for the DU and that is carried in first signaling is a hard resource type, wherein the first signaling comprises at least one of the following: a synchronization signal block (SSB), a physical downlink control channel (PDCCH), or a channel state information-reference signal (CSI-RS).

11. The method according to claim 1, further comprising:

wherein the frequency domain resource parameter further comprises at least one of the following: a bandwidth, or a frequency domain location.

12. The method according to claim 2, wherein the configuration information of the guard band further comprises: a bandwidth of the guard band.

13. The method according to claim 12, wherein the location of the guard band further comprises at least one of the following:

the upper boundary of the frequency domain resource for the second device; or the lower boundary of the frequency domain resource for the second device.

14. The method according to claim 2, further comprising:

when the guard band is configured in the MT of the IAB node, when an overlap exists between a scheduled frequency domain resource for the MT and the guard band, performing, by the MT, rate matching or puncturing on the overlap.

15. The method according to claim 2, further comprising:

when the guard band is configured in the DU of the IAB node, sending the configuration information of the guard band to a fourth device scheduled by the DU.

16. The method according to claim 2, further comprising:

sending an expected guard band parameter to the first device, wherein the guard band parameter comprises at least one of the following: a bandwidth of the guard band or a frequency domain location of the guard band.

17. The method according to claim 2, wherein when the frequency domain configuration information comprises only the configuration information of the guard band, the frequency domain resource for the DU of the IAB node is on a first side of the guard band, and a frequency domain resource for the MT of the IAB node is on a second side of the guard band.

18. The method according to claim 2, wherein a frequency domain resource for the IAB node and a frequency domain resource for a parent node of the IAB node are frequency domain resources allocated in a first allocation direction, wherein the first allocation direction is predefined in a protocol or configured by a first device.

19. An Integrated Access Backhaul (IAB) node, comprising:

a memory storing a computer program; and a processor coupled to the memory and configured to execute the computer program to perform a method for frequency domain resource processing, the method comprising:

sending an expected frequency domain resource parameter to a first device, wherein the frequency domain resource parameter comprises a resource type, the resource type comprises a shared resource type, wherein the shared resource type is simultaneously usable by a distributed unit (DU) of the IAB node and a mobile termination (MT) of the IAB node;

obtaining frequency domain configuration information from the first device, wherein the frequency domain configuration information comprises configuration information of a guard band configured for a second device on the IAB node; and performing information transmission based on the frequency domain configuration information, wherein the configuration information of the guard band specifies a location of the guard band relative to a frequency domain resource for the second device, comprising at least one of the following:

the guard band being placed at a frequency domain location adjacent to an upper boundary of the frequency domain resource for the second device;

the guard band being placed at a frequency domain location adjacent to a lower boundary of the frequency domain resource for the second device; or the guard band being placed at the smallest frequency domain distance away from a frequency domain resource for a third device in the frequency domain resource for the second device, wherein the third device is a device other than the second device on the IAB node.

20. A non-transitory computer-readable storage medium, storing a computer program, when the computer program is executed by a processor, performs a method for frequency domain resource processing, the method comprising:

sending an expected frequency domain resource parameter to a first device, wherein the frequency domain resource parameter comprises a resource type, the resource type comprises a shared resource type, wherein the shared resource type is simultaneously usable by a distributed unit (DU) of an Integrated Access Backhaul (IAB) node and a mobile termination (MT) of the IAB node;

obtaining frequency domain configuration information from the first device, wherein the frequency domain configuration information comprises configuration information of a guard band configured for a second device on the IAB node; and performing information transmission based on the frequency domain configuration information, wherein the configuration information of the guard band specifies a location of the guard band relative to a frequency domain resource for the second device, comprising at least one of the following:

the guard band being placed at a frequency domain location adjacent to an upper boundary of the frequency domain resource for the second device;

the guard band being placed at a frequency domain location adjacent to a lower boundary of the frequency domain resource for the second device; or the guard band being placed at the smallest frequency domain distance away from a frequency domain resource for a third device in the frequency domain resource for the second device, wherein the third device is a device other than the second device on the IAB node.

* * * * *